(12) United States Patent
Heng et al.

(10) Patent No.: US 8,374,247 B2
(45) Date of Patent: Feb. 12, 2013

(54) METHOD AND SYSTEM FOR HIERARCHICAL MOTION ESTIMATION WITH MULTI-LAYER SUB-PIXEL ACCURACY AND MOTION VECTOR SMOOTHING

(75) Inventors: Brian Heng, Irvine, CA (US); Xuemin Chen, San Diego, CA (US); Frederick G. Walls, Norristown, PA (US)

(73) Assignee: Broadcom Corporation, Irvine, CA (US)

( * ) Notice: Subject to any disclaimer, the term of this patent is extended or adjusted under 35 U.S.C. 154(b) by 1247 days.

(21) Appl. No.: 12/013,882

(22) Filed: Jan. 14, 2008

(65) Prior Publication Data
US 2009/0180032 A1 Jul. 16, 2009

(51) Int. Cl.
*H04N 11/02* (2006.01)
(52) U.S. Cl. .................................. 375/240.16
(58) Field of Classification Search .......... 375/240.16, 375/240.26, 240.12, 240.07, 240.21, 240.15
See application file for complete search history.

(56) References Cited

U.S. PATENT DOCUMENTS 7,965,303 B2 * 6/2011 Hanaoka et al. ............... 345/606
2005/0175102 A1 * 8/2005 Ha .......................... 375/240.16

* cited by examiner

*Primary Examiner* — Kwang B Yao
*Assistant Examiner* — Anh Ngoc Nguyen
(74) *Attorney, Agent, or Firm* — Thomas | Horstemeyer, LLP (57) ABSTRACT

Aspects of a method and system for hierarchical motion estimation with multi-layer sub-pixel accuracy and motion vector smoothing are presented. Aspects of the system may include hierarchical motion vector computation that enables motion vectors to be computed at each level in the hierarchy based on a distinct pixel resolution level. A smoothing algorithm may be utilized to suppress spurious motion vector generation. The motion vectors computed at one level in the hierarchy may be utilized when computing motion vectors in a subsequent level. A bias value may be computed for each motion vector that provides an evaluation metric that may enable determination of whether the computed motion vector is to be utilized to enable generation of the interpolated image frame.

20 Claims, 8 Drawing Sheets

METHOD AND SYSTEM FOR HIERARCHICAL MOTION ESTIMATION WITH MULTI-LAYER SUB-PIXEL ACCURACY AND MOTION VECTOR SMOOTHING

CROSS-REFERENCE TO RELATED APPLICATIONS/INCORPORATION BY REFERENCE

NOT APPLICABLE.

FIELD OF THE INVENTION

Certain embodiments of the invention relate to video communication and processing. More specifically, certain embodiments of the invention relate to a method and system for hierarchical motion estimation with multi-layer sub-pixel accuracy and motion vector smoothing.

BACKGROUND OF THE INVENTION

In many video processing applications, in which moving objects may be displayed in a sequence of image frames, it may be useful to have knowledge of the motion which occurs from frame to frame. Examples of such applications include, frame rate conversion, deinterlacing, noise reduction, and cross-chroma reduction. In a typical method for frame rate conversion, for example one that enables doubling of the frame rate of a video sequence, each image frame may be repeated twice. By instead taking this motion information into account, one can perform adaptive processing that adapts to and compensates for the motion in the scene.

There have been many methods proposed for modeling the motion in a scene. One such method is a translational block-based model. In this model, the original frame is broken into small blocks, and the motion between frames is modeled in terms of translational shifts of these blocks. Each block is assigned a two-dimensional (horizontal/vertical) motion vector (MV) that describes the translational shift assigned to each block.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for hierarchical motion estimation with multi-layer sub-pixel accuracy and motion vector smoothing, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention relate to a method and system for hierarchical motion estimation with multi-layer sub-pixel accuracy and motion vector smoothing. Various embodiments of the invention comprise a method and system in which a plurality of motion vectors may be computed based on a multi-level motion vector computation hierarchy. A motion vector may be computed based on the location of a picture element (pixel) neighborhood in a preceding image frame and the location of a corresponding pixel neighborhood in a current image frame. The correspondence between the pixel neighborhood in the preceding image frame and the pixel neighborhood in the current image frame may be established based on a correlation computation between the pixel neighborhoods. A corresponding pixel neighborhood may be generated within an interpolated image frame, where the interpolated image frame may be temporally located between the preceding image frame and the current image frame, based on the correlated pixel neighborhoods in the preceding and current image frames.

One aspect of the invention comprises a method for computing a motion vector based on a hierarchical technique. A plurality of subsampled image frames may be generated, each based on a different subsampling ratio. For example, a first level subsampled image frame may be generated by utilizing a subsampling ratio of 2×2. In this case, the first level subsampled image frame may be generated by selecting every other pixel from an original image frame, or a filtered version of the original image frame, with respect to each spatial dimension within the image frame. A second level subsampled image frame may be generated by utilizing a subsampling ratio of 4×4. In this case, the second level subsampled image frame may be generated by selecting every fourth pixel from the original image frame, or a filtered version of the original image frame, with respect to each image dimension within the image frame. Each subsampling ratio may define a pixel resolution level.

Within each hierarchical layer a plurality of motion vectors may be computed. In one aspect of the invention, a motion vector at each hierarchical layer may be computed based on the corresponding pixel resolution level. For example, within the exemplary second level subsampled image frame, the motion vectors may be computed based on a pixel resolution level of 4 pixels.

In various embodiments of the invention, the motion vectors within a given hierarchical level may be computed by interpolating pixel locations that are located between the pixel locations within an original or subsampled image frame. These interpolated pixel locations may be computed by utilizing an interpolation filter to process the original or subsampled image frames at each hierarchical level. The motion vectors may then be computed based on the interpolation filtered versions of the original or subsampled image frames at each hierarchical level. The motion vectors so computed may be computed at subpixel accuracy.

For example, when the interpolation filter enables the generation of fifteen (15) interpolated pixel locations for each pixel location in an original or subsampled image frame, the number of pixels in the interpolated version of the original or subsampled image frame may be sixteen (16) times the number of pixels in the original or subsampled image frame. In this instance, motion vectors may be computed at quarter pixel accuracy (quarter pixel accuracy in both the horizontal and vertical directions). When the interpolation filter enables the generation of three (3) interpolated pixel location for each pixel location in an original or subsampled image frame, the number of pixels in the interpolated version of the original or subsampled image frame may be four (4) times the number of pixels in the original or subsampled image frame. In this instance, motion vectors may be computed at half pixel accuracy (half pixel accuracy in both the horizontal and vertical directions). When motion vectors are computed based on an original or subsampled image frame, the motion vectors may be computed at full pixel accuracy.

In various embodiments of the invention the subpixel accuracy level utilized for computing motion vectors may be determined independently from the amount of subsampling that is utilized to generate the image(s) from which the motion vectors are computed. For example, in various embodiments of the invention, a subsampled image frame may be generated from an original image frame by utilizing a 4×4 subsampling ratio. The motion vectors computed based on the subsampled image frame may be computed at half pixel accuracy, for example.

In various embodiments of the invention, a motion vector that is computed in one hierarchical layer may be utilized to compute a motion vector in a subsequent hierarchical layer. At any level of the motion vector computation hierarchy, the motion vectors may be computed at subpixel accuracy. For example, in the exemplary second level subsampled image frame, a second level motion vector may be computed based on the pixel resolution level for the second level subsampled image frames. The second level motion vector may be computed based on a pixel neighborhood within a second level subsampled preceding image frame and a correlated pixel neighborhood within a second level subsampled current image frame.

A first level motion vector may be computed based on the pixel resolution level for the first level subsampled image. The first level motion vector may be computed based on a pixel neighborhood within a first level subsampled preceding image frame and a correlated pixel neighborhood within a first level subsampled current image frame. The location of pixel neighborhood in the first level subsampled preceding image frame may be selected from within the vicinity of the pixel neighborhood in the second level subsampled preceding image frame that was utilized for computing the second level motion vector. The location of a corresponding pixel neighborhood in the first level subsampled current image frame may be selected from within the vicinity of the pixel neighborhood in the second level subsampled current image frame that was pointed to by the corresponding second level motion vector. A first level motion vector may be computed based on the pixel resolution level for the first level subsampled image frames. The first level motion vector may be computed based on the correlated pixel neighborhoods in the first level subsampled preceding and current image frames.

In various embodiments of the invention, a plurality of motion vectors may be computed at any given level in the motion vector computation hierarchy. A current level smoothed motion vector may be computed by applying a smoothing algorithm that utilizes a subset of the motion vectors computed within the current level in the motion vector computation hierarchy. The subset may comprise a plurality of computed motion vectors that point to locations within a proximal area within the current image frame, for example.

During the computation of motion vectors at the current level in the motion vector hierarchy, a bias value may be associated with each of the computed motion vectors. The bias values may be utilized to enable selection of candidate motion vectors from a group of motion vectors that are computed in a current level in the motion vector hierarchy. The bias values may also be utilized to determine which motion vectors that are computed in the current level in the motion vector hierarchy may be utilized to enable computation of motion vectors in a subsequent level in the motion vector hierarchy. A bias value may be determined by computing a distance between a computed motion vector and a computed median motion vector. The distance may be multiplied by a weighting scale value. The median motion vector may be computed by computing a median vector based on a group of selected motion vectors that are computed within the current level in the motion vector computation hierarchy. The group of selected motion vectors may comprise a plurality of computed motion vectors that point to locations within a proximal area within the current image frame, for example.

Various embodiments of the invention may utilize various levels of hierarchy in the motion vector computation process. Each of the hierarchical levels may utilize various selected subsampling ratios and/or pixel resolution levels. For purposes of this application, various embodiments of the invention may be practiced for processing frames, fields and/or pictures.

Figure 1:
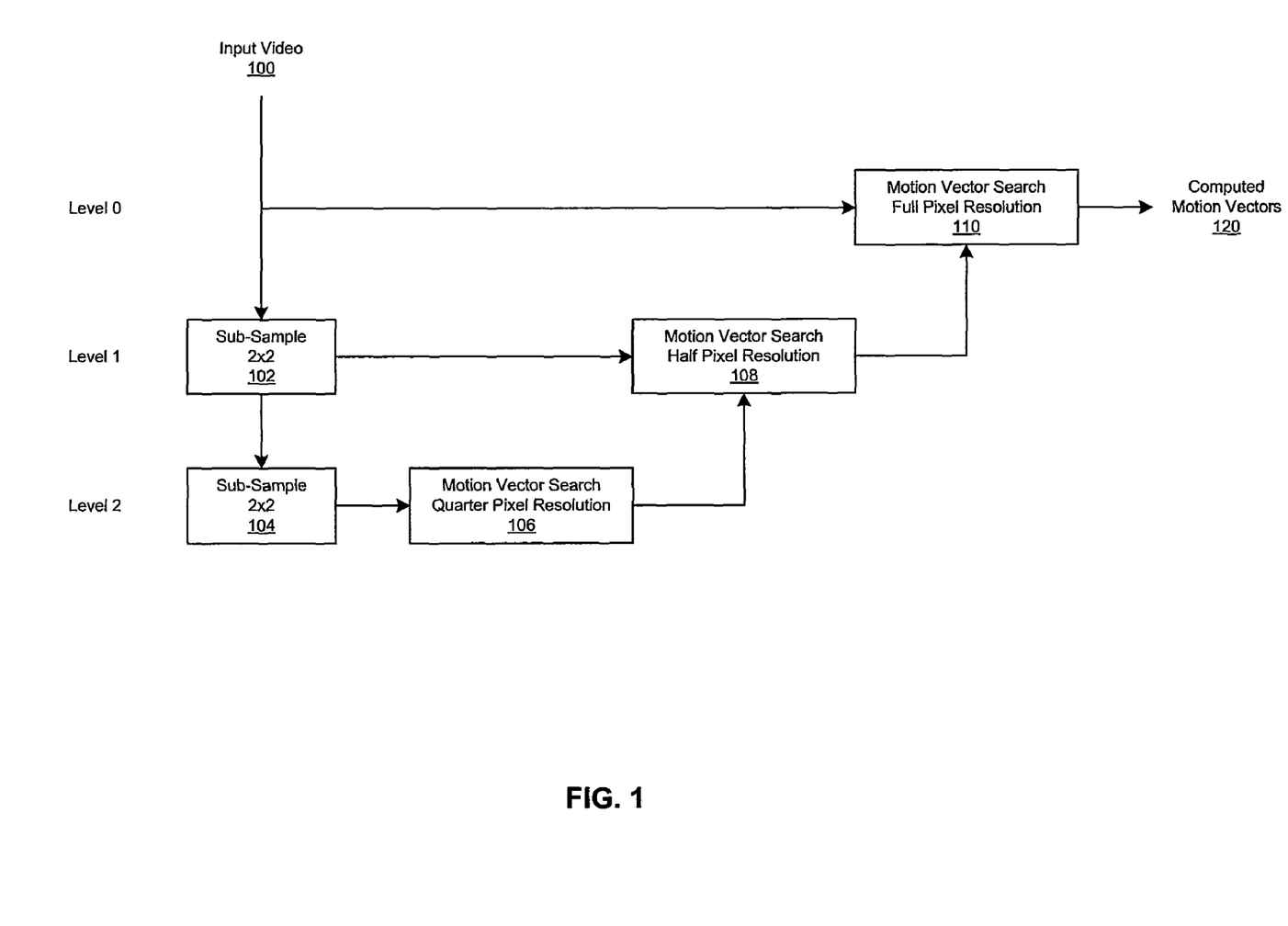
FIG. 1 is an exemplary diagram of a system for hierarchical motion estimation with multi-layer sub-pixel accuracy, in accordance with an embodiment of the invention.

FIG. 1 is an exemplary diagram of a system for hierarchical motion estimation with multi-layer sub-pixel accuracy, in accordance with an embodiment of the invention. The hierarchy shown in FIG. 1 comprises a level 0, level 1 and level 2. Each of the levels represents a distinct level within the motion vector computation hierarchy. Referring to FIG. 1, there is shown input video 100, sub-sample blocks 102 and 104, a motion vector search at quarter pixel resolution (quarter pixel) block 106, a motion vector search at half pixel resolution (half pixel) block 108 and a motion vector search at full pixel resolution (full pixel) block 110.

The input video 100 may comprise a sequence of image frames. Each image frame may be represented as an M×N pixel block, where M represents the number of lines in the image frame and N represents the number of pixels within each line. The M×N pixel block, which is utilized in level 0 of the motion vector computation hierarchy, may represent a full pixel image frame.

The sub-sample 2×2 block 102 may comprise suitable logic, circuitry and/or code that may utilize a subsampling ratio of 2×2. The sub-sample 2×2 block 102 may receive an M×N pixel block and generate a level 1 subsampled image frame comprising a (½M)×(½N) pixel block. The level 1 subsampled image frame, which may be utilized in level 1 of the motion vector computation hierarchy, may represent a half pixel image frame.

The sub-sample 2×2 block 104 may comprise suitable logic, circuitry and/or code that may utilize a subsampling ratio of 2×2, which when combined with the sub-sample 2×2 block 102 may create an effective subsampling ratio of 4×4. The sub-sample 2×2 block 104 may receive a (½M)×(½N) pixel block and generate a level 2 subsampled image frame comprising a (¼M)×(¼N) pixel block. The level 2 subsampled image frame, which may be utilized in level 2 of the motion vector computation hierarchy, may represent a quarter pixel image frame.

The quarter pixel block 106 may comprise suitable logic, circuitry and/or code that may enable computation of motion vectors based on a current quarter pixel image frame and a preceding quarter pixel image frame. In various embodiments of the invention, the motion vectors computed by the quarter pixel block 106 may utilize quarter pixel resolution. A pixel neighborhood, comprising a pixel block (where the pixel block is smaller than the image frame size), at a selected location within the preceding quarter pixel image frame may be selected as a level 2 preceding image processing block. A plurality of motion vectors may be computed by computing a correlation value between the level 2 preceding image processing block and each pixel block within a specified level 2 pixel motion vector search area within a current quarter pixel image frame. The pixel locations within the specified level 2 current pixel motion vector search area may correspond to the set of pixel locations within the preceding quarter pixel image frame from which the level 2 preceding image processing block is selected. The quarter pixel block 106 may utilize an interpolation filter to enable the computation of level 2 motion vectors at subpixel accuracy. The quarter pixel block 106 may enable the generation of interpolated pixel locations within each pixel block in the current and preceding quarter pixel image frames. This increases the number of pixel locations within each of the post-interpolation quarter pixel image frames and thereby enables the computation of level 2 motion vectors at subpixel accuracy. A maximum correlation value may indicate a location of a level 2 current image processing block within the current quarter pixel image frame, which corresponds to the level 2 preceding image processing block. In an exemplary embodiment of the invention, a level 2 motion vector may be computed based on the location of the level 2 preceding image processing block and the corresponding level 2 current image processing block.

The half pixel block 108 may comprise suitable logic, circuitry and/or code that may enable computation of level 1 motion vectors based on a current half pixel image frame, a preceding half pixel image frame and one or more computed level 2 motion vectors. In various embodiments of the invention, the level 1 motion vectors computed by the half pixel block 108 may utilize half pixel resolution. In an exemplary embodiment of the invention a pixel neighborhood, comprising a pixel block at a selected location within the preceding half pixel image frame may be selected as a level 1 preceding image processing block. The center location for the selected level 1 preceding image processing block may be determined based on a level 2 motion vector, which was computed as described above. In addition, a level 1 current pixel motion vector search area may be selected within the current half pixel image frame. The center location for the selected level 1 current pixel motion vector search area may be determined based on the computed level 2 motion vector.

A plurality of level 1 motion vectors may be computed by computing a correlation value between the level 1 preceding image processing block and each pixel block within the level 1 current pixel motion vector search area. The half pixel block 108 may utilize an interpolation filter to enable the computation of level 1 motion vectors at subpixel accuracy. The half pixel block 108 may enable the generation of interpolated pixel locations in the level 1 preceding image processing block and in the level 1 current pixel motion vector search area. This increases the number of pixel locations within the post-interpolation level 1 preceding image processing block and the post-interpolation level 1 current pixel motion vector search area and thereby enables the computation of level 1 motion vectors at subpixel accuracy.

The full pixel block 110 may comprise suitable logic, circuitry and/or code that may enable computation of level 0 motion vectors based on a current full pixel image frame, a preceding full pixel image frame and one or more computed level 1 motion vectors. In various embodiments of the invention, the level 0 motion vectors computed by the full pixel block 110 may utilize full pixel resolution. In an exemplary embodiment of the invention a pixel neighborhood, comprising a pixel block at a selected location within the preceding full pixel image frame may be selected as a level 0 preceding image processing block. The center location for the selected level 0 preceding image processing block may be determined based on a level 1 motion vector, which was computed as described above. In addition, a level 0 current pixel motion vector search area may be selected within the current full pixel image frame. The center location for the selected level 0 current pixel motion vector search area may be determined based on the computed level 1 motion vector.

A plurality of level 0 motion vectors may be computed by computing a correlation value between the level 0 preceding image processing block and each pixel block within the level 0 current pixel motion vector search area. The full pixel block 110 may utilize an interpolation filter to enable the computation of level 0 motion vectors at subpixel accuracy. The full pixel block 110 may enable the generation of interpolated pixel locations in the level 0 preceding image processing block and in the level 0 current pixel motion vector search area. This increases the number of pixel locations within the post-interpolation level 0 preceding image processing block and the post-interpolation level 0 current pixel motion vector search area and thereby enables the computation of level 0 motion vectors at subpixel accuracy.

The full pixel block 110 may output a set of computed level 0 motion vectors 120. In various embodiments of the invention, the set of computed level 0 motion vectors 120 may be utilized to enable generation of an interpolated image frame, which may be temporally located between the preceding image frame and the current image frame. The computed level 0 motion vectors 120 may enable computation of the interpolated image frame based on the full pixel resolution level.

Figure 2A:
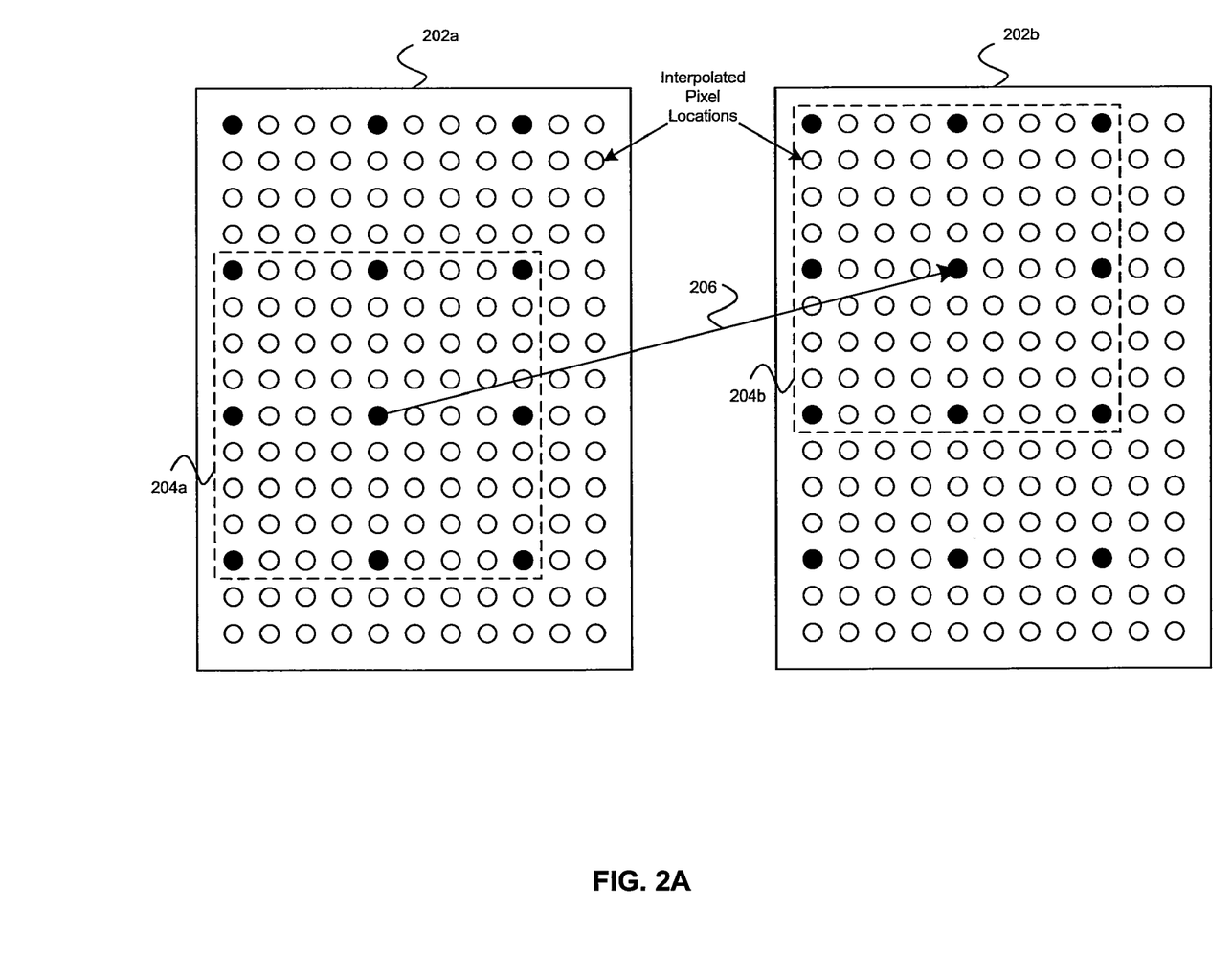
FIG. 2A is a diagram that illustrates exemplary level 2 motion estimation, in accordance with an embodiment of the invention.

FIG. 2 present exemplary illustrations of hierarchical motion estimation with multi-layer sub-pixel accuracy, in accordance with an embodiment of the invention. FIG. 2A is a diagram that illustrates exemplary level 2 motion estimation, in accordance with an embodiment of the invention. Referring to FIG. 2A, there is shown a preceding level 2 pixel motion vector search area within a preceding quarter pixel image frame 202a and current level 2 pixel motion vector search area within a current quarter pixel image frame 202b. A level 2 preceding image processing block 204a may be selected within the preceding level 2 pixel motion vector search area 202a. A corresponding level 2 current image processing block 204b may be selected based on a correlation value computation between the level 2 preceding image processing block 204a and each pixel block within the current level 2 pixel motion vector search area 202b. The quarter pixel block 106 may compute a level 2 motion vector 206 based on the image processing blocks 204a and 204b. The level 2 motion vector 206 may be computed at the quarter pixel resolution level. The quarter pixel block 106 may utilize an interpolation filter to generate interpolated pixel locations within the motion vector search areas 202a and 202b. The interpolated pixel locations may enable the quarter pixel block 106 to compute the motion vector 206 at a subpixel level of accuracy.

Figure 2B:
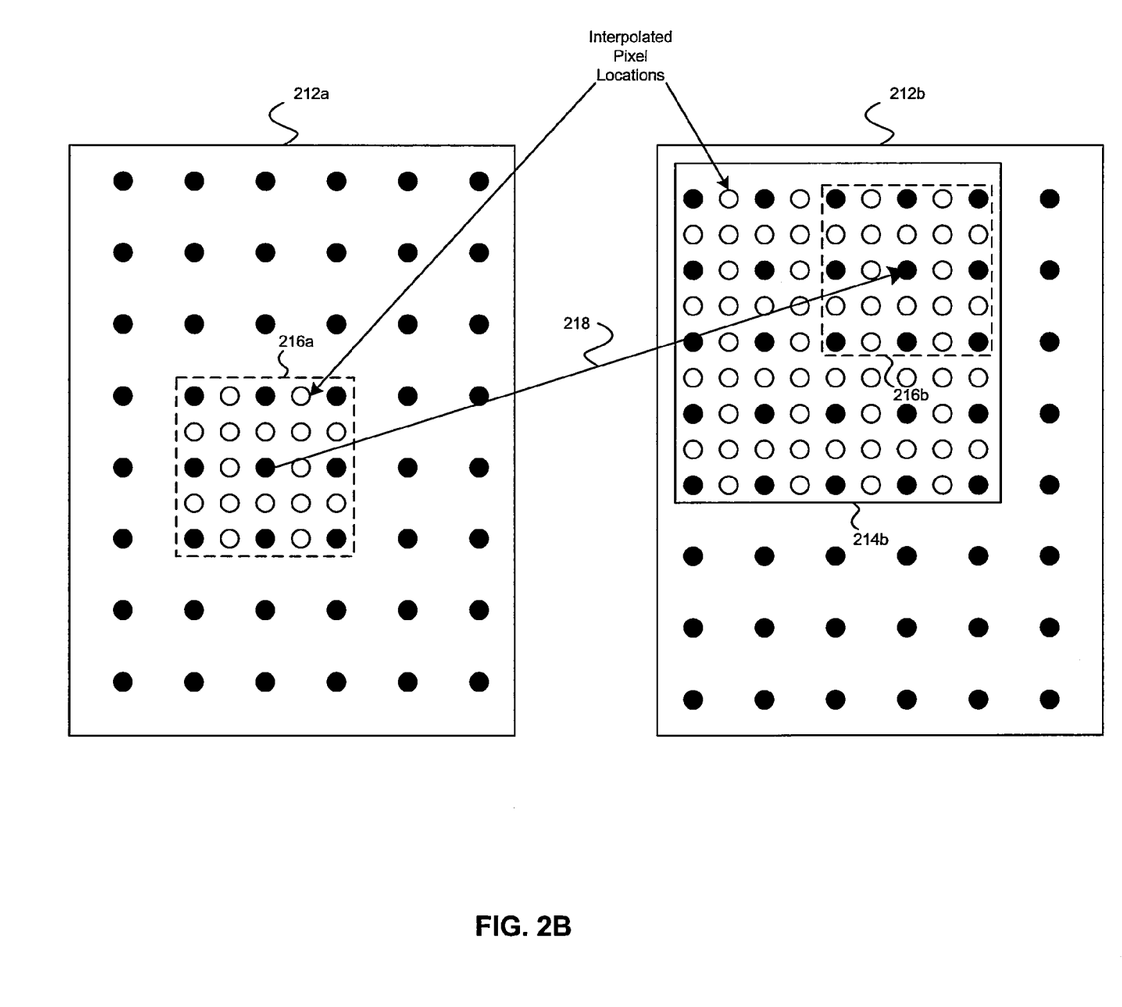
FIG. 2B is a diagram that illustrates exemplary level 1 motion estimation, in accordance with an embodiment of the invention.

FIG. 2B is a diagram that illustrates exemplary level 1 motion estimation, in accordance with an embodiment of the invention. Referring to FIG. 2B, there is shown a preceding half pixel image frame 212a and a current half pixel image frame 212b. A level 1 preceding image processing block 216a may be selected within the preceding half pixel image frame 212a. The location of the level 1 preceding image processing block 216a may be determined based on the level 2 motion vector 206 (FIG. 2A). A level 1 current pixel motion vector search area 214b may be selected within the current half pixel image frame 212b. The location of the pixel motion vector search area 214b may be determined based on the level 2 motion vector 206. A level 1 current image processing block 216b may be selected based on a correlation value computation between the level 1 preceding image processing block 216a and each pixel block within the level 1 current pixel motion vector search area 214b. A level 1 motion vector 218 may be computed based on the image processing blocks 216a and 216b. The level 1 motion vector 218 may be computed at the half pixel resolution level. The half pixel block 108 may utilize an interpolation filter to generate interpolated pixel locations within the image processing block 216a and within the motion vector search area 214b. The interpolated pixel locations may enable the quarter pixel block 106 to compute the motion vector 218 at a subpixel level of accuracy.

Figure 2C:
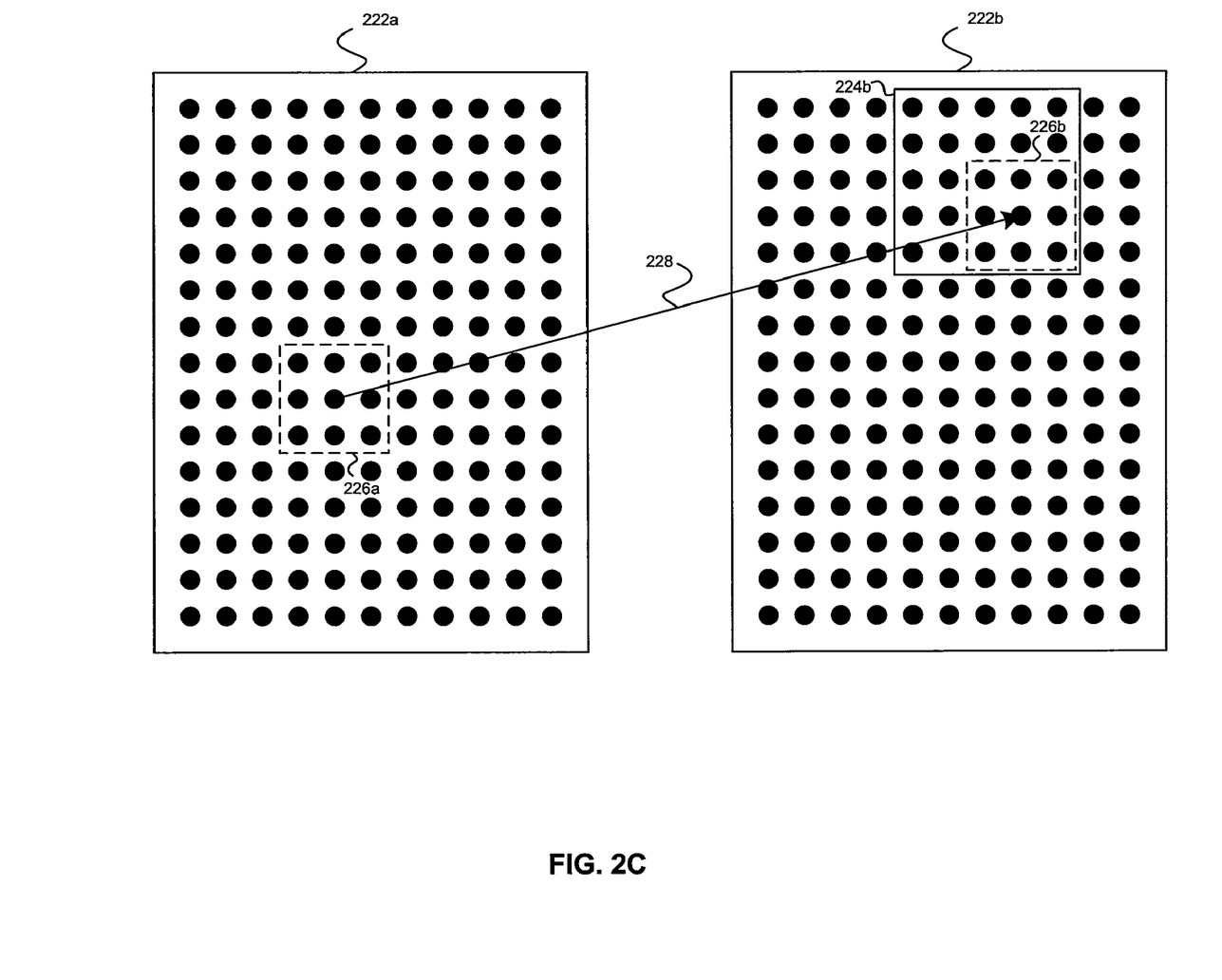
FIG. 2C is a diagram that illustrates exemplary level 0 motion estimation, in accordance with an embodiment of the invention.

FIG. 2C is a diagram that illustrates exemplary level 0 motion estimation, in accordance with an embodiment of the invention. Referring to FIG. 2C, there is shown a preceding full pixel image frame 222a and a current full pixel image frame 222b. A level 0 preceding image processing block 226a may be selected within the preceding half pixel image frame 222a. The location of the level 0 preceding image processing block 226a may be determined based on the level 1 motion vector 218 (FIG. 2B). A level 0 current pixel motion vector search area 224b may be selected within the current full pixel image frame 222b. The location of the pixel motion vector search area 224b may be determined based on the level 1 motion vector 218. A level 0 current image processing block 226b may be selected based on a correlation value computation between the level 0 preceding image processing block 226a and each pixel block within the level 0 current pixel motion vector search area 224b. A level 0 motion vector 228 may be computed based on the image processing blocks 226a and 226b. The level 0 motion vector 228 may be computed at the full pixel resolution level.

Various embodiments of the invention may be practiced with differing numbers of levels in the motion vector computing hierarchy. For example, an exemplary embodiment of the invention may utilize more or less than three (3) levels in the motion vector computing hierarchy. Various embodiments of the invention may be practiced with differing subsampling ratios and/or interpolation ratios. The subsampling ratios may be determined independently from the interpolation ratios and vice versa. Subsampling ratios may be selected independently for each level in the motion vector computing hierarchy. Interpolation ratios may be selected independently for each level in the motion vector computing hierarchy. Various embodiments of the invention may be practiced with preceding and current image frames of varying sizes, with motion vector search areas of varying pixel neighborhood sizes and/or with preceding and current image processing blocks of varying pixel neighborhood sizes. For example, an exemplary embodiment of the invention may utilize 3×3, 5×5 or 9×9 pixel neighborhood sizes for preceding and current image processing blocks. Various embodiments of the invention may be practiced with the roles of the preceding and current images reversed such that motion vectors may be found in both the forward and backward temporal directions.

Figure 3:
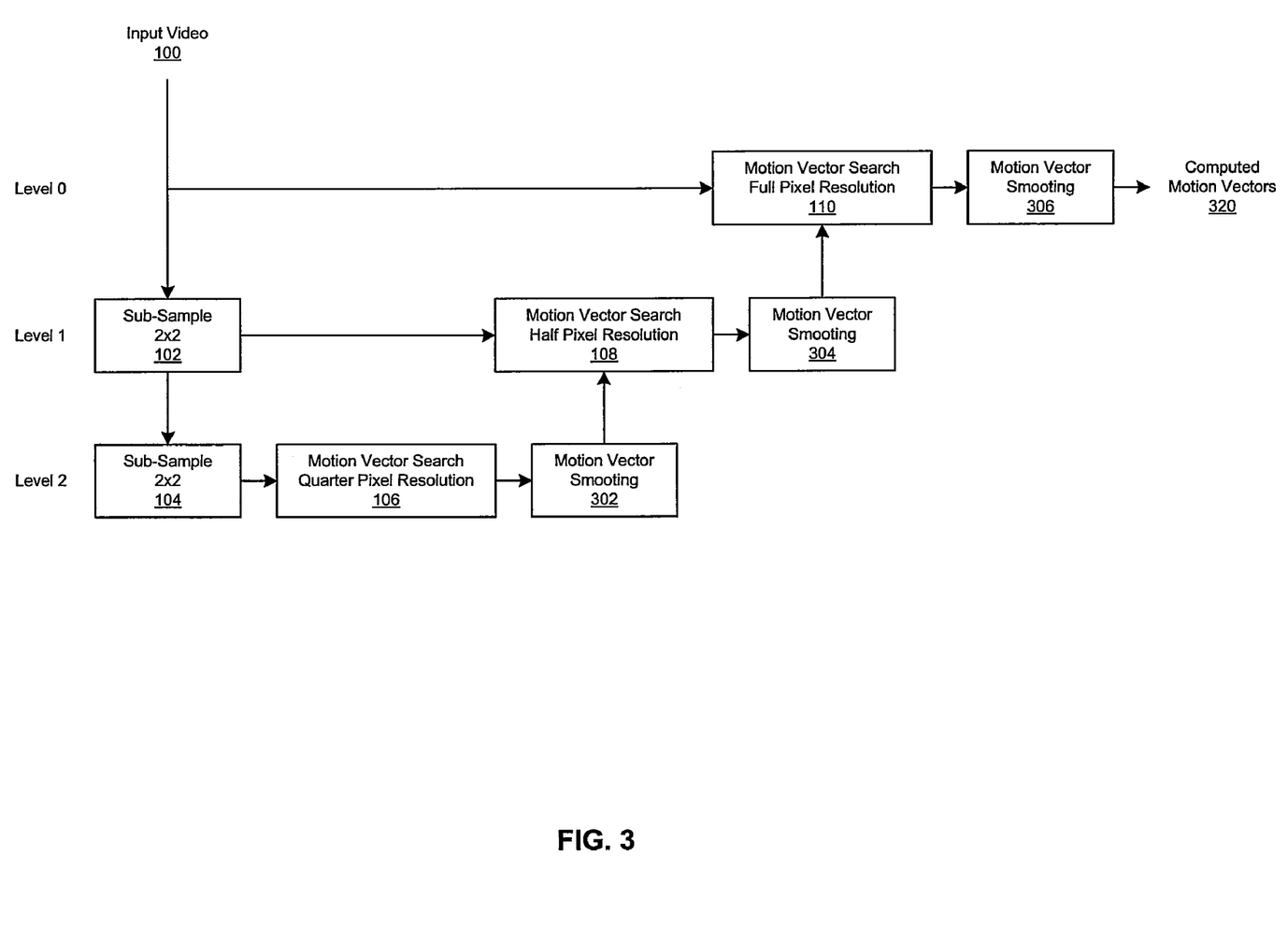
FIG. 3 is an exemplary diagram of a system for hierarchical motion estimation with multi-layer sub-pixel accuracy and motion vector smoothing, in accordance with an embodiment of the invention.

FIG. 3 is an exemplary diagram of a system for hierarchical motion estimation with multi-layer sub-pixel accuracy and motion vector smoothing, in accordance with an embodiment of the invention. Referring to FIG. 3, there is shown input video 100, sub-sample blocks 102 and 104, a quarter pixel block 106 a half pixel block 108, a full pixel block 110 and motion vector smoothing blocks 302, 304 and 306.

The vector smoothing block 302 may comprise suitable logic, circuitry and/or code that may enable reception of an input group of level 2 motion vectors computed by the quarter pixel block 106. The group of level 2 motion vectors may comprise a subset of the motion vectors computed by the quarter pixel block 106 based on quarter pixel image frames 202a and 202b. The vector smoothing block 302 may utilize a smoothing algorithm to compute a smoothed level 2 motion vector based on the group of input level 2 motion vectors. The set of smoothed level 2 motion vectors computed in layer 2 of the motion vector computation hierarchy may be sent as input to the half pixel block 108. The half pixel block 108 may utilize the smoothed level 2 motion vectors to enable computation of level 1 motion vectors. In an exemplary embodiment of the invention, the smoothing algorithm may comprise a filtering algorithm. For example, the vector smoothing block 302 may receive the group of level 2 motion vectors and compute a smoothed level 2 motion vector based on an average value for the level 2 motion vectors in the group. In another example, the vector smoothing block 302 may receive the group of level 2 motion vectors and compute a smoothed level 2 motion vector based on a median value for the level 2 motion vectors in the group.

The vector smoothing block 304 may be substantially similar to the vector smoothing block 302. The vector smoothing block 304 may receive as input a group of level 1 motion vectors computed by the half pixel block 108. The group of level 1 motion vectors may comprise a subset of the motion vectors computed by the half pixel block 108 based on half pixel image frames 212a and 212b. The vector smoothing block 304 may utilize a smoothing algorithm to compute a smoothed level 1 motion vector based on the group of input level 1 motion vectors. The set of smoothed level 1 motion vectors computed in layer 1 of the motion vector computation hierarchy may be sent as input to the full pixel block 110. The full pixel block 110 may utilize the smoothed level 1 motion vectors to enable computation of level 0 motion vectors.

The vector smoothing block 306 may be substantially similar to the vector smoothing block 302. The vector smoothing block 306 may receive as input a group of level 0 motion vectors computed by the full pixel block 110. The group of level 0 motion vectors may comprise a subset of the motion vectors computed by the full pixel block 110 based on full pixel image frames 222a and 222b. The vector smoothing block 306 may utilize a smoothing algorithm to compute a smoothed level 0 motion vector based on the group of input level 0 motion vectors. The set of smoothed level 0 motion vectors computed in layer 0 of the motion vector computation hierarchy may comprise the computed motion vectors 320.

Figure 4:
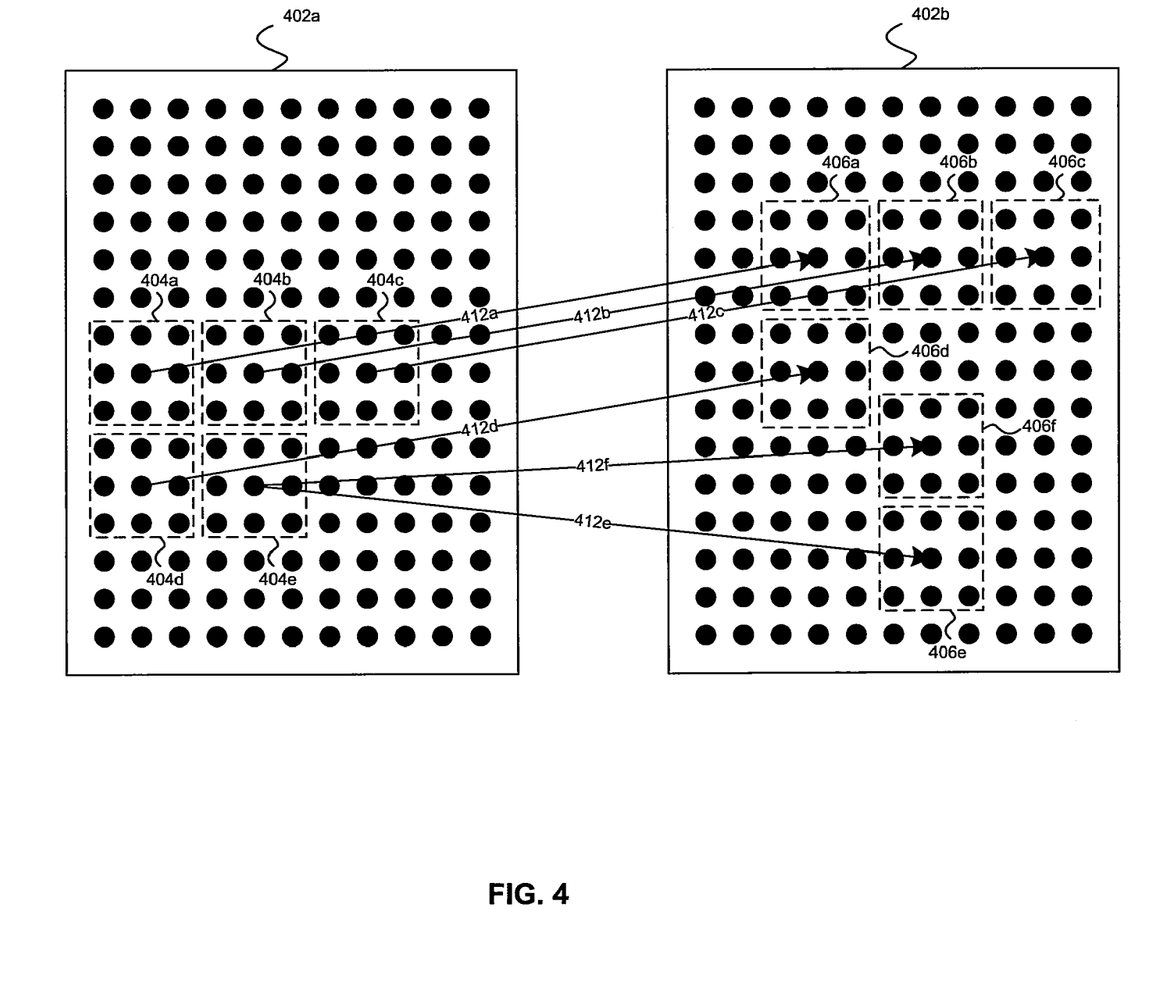
FIG. 4 is an exemplary block diagram of a method for motion vector smoothing, in accordance with an embodiment of the invention.

FIG. 4 is an exemplary block diagram of a method for motion vector smoothing, in accordance with an embodiment of the invention. Referring to FIG. 4, there is shown a preceding image frame 402a and a current image frame 402b. A plurality of preceding image processing blocks 404a, 404b, 404c, 404d and 404e may be selected within the preceding image frame 402a. A motion vector 412a may represent a motion vector computed based on the preceding image processing block 404a and the current image processing block 406a within the current image frame 402b. A motion vector 412b may represent a motion vector computed based on the preceding image processing block 404b and the current image processing block 406b within the current image frame 402b. A motion vector 412c may represent a motion vector computed based on the preceding image processing block 404c and the current image processing block 406c within the current image frame 402b. A motion vector 412d may represent a motion vector computed based on the preceding image processing block 404d and the current image processing block 406d within the current image frame 402b. A motion vector 412e may represent a motion vector computed based on the preceding image processing block 404e and the current image processing block 406e within the current image frame 402b.

In an exemplary embodiment of the invention, the computed motion vectors 412a, 412b, 412c, 412d and 412e may represent level 0 motion vectors that were computed by the full pixel resolution block 110. An exemplary motion vector smoothing block 306, which utilizes an averaging filter, may compute an average value based on the computed motion vectors 412a, 412b, 412c, 412d and 412e and generate a smoothed motion vector 412f based on the computed average value. The smoothed motion vector 412f replaces the motion vector 412e. The smoothed motion vector 412f and the preceding image processing block 404e may be utilized to determine the location of a corresponding current image processing block 406f within the current image frame 402b.

In practice, the quarter pixel block 106, half pixel block 108 and/or full pixel block 110 may compute spurious motion vectors when computing motion vectors based on the corresponding preceding and current image frames. The spurious motion vectors may produce an appearance of inconsistent motion in interpolated image frames, which are generated based on the spurious motion vectors. In various embodiments of the invention, the motion vector smoothing blocks 302, 304 and/or 306 may enable a suppression of spurious motion vectors computed by the quarter pixel block 106, half pixel block 108 and/or full pixel block 110, which may suppress the appearance of inconsistent motion in interpolated image frames.

Referring to FIG. 4, one or more candidate motion vectors may be computed for the image processing block 412e. A bias value may be computed for each candidate motion vector based on the candidate motion vector and a predicted motion vector. The predicted motion vector may be computed for the image processing block 412e, may be determined by computing a median value based on the motion vectors 412a, 412b, 412c and 412d. In other embodiments of the invention and/or at other levels in the hierarchy, the corresponding motion vector from the previous level in the hierarchy may be used as the predicted vector. The predicted motion vector may be represented by coordinate values (pred_mvx,pred_mvy). Each of the candidate motion vectors may be represented by coordinate values (vx,vy). The motion vector bias value may be computed as shown in the following equation:

$$\text{bias} = \max(|\text{pred\_mvx} - \text{vx}|, |\text{pred\_mvy} - \text{vy}|) \cdot \text{MEDIAN\_BIAS\_MULT} \quad [1]$$

where MEDIAN_BIAS_MULT represents a weighting scale factor and the coordinate values (vx,vy) and (pred_mvx, pred_mvy) may be defined in relation to locations within the preceding image frame 402a and the current image frame 402b.

In various embodiments of the invention, each computed motion vector bias value may be added to a corresponding distortion and/or cost value for the associated candidate motion vector. The distortion and/or cost value may be computed based on a sum of absolute differences and/or mean square error, for example. The bias values and corresponding distortion and/or cost values may be utilized to enable selection of one of the candidate motion vectors for the image processing block 412e.

In various embodiments of the invention, the bias value and corresponding distortion and/or cost values for motion vectors selected at search level 2 in the motion vector computation hierarchy may be utilized to enable selection of candidate motion vectors at search level 1 in the motion vector computation hierarchy. The bias value and corresponding distortion and/or cost values for motion vectors selected at search level 1 in the motion vector computation hierarchy may be utilized to enable selection of candidate motion vectors at search level 0 in the motion vector computation hierarchy. The bias value and corresponding distortion and/or cost value for a given candidate motion vector may be referred to as a motion vector cost.

Figure 5:
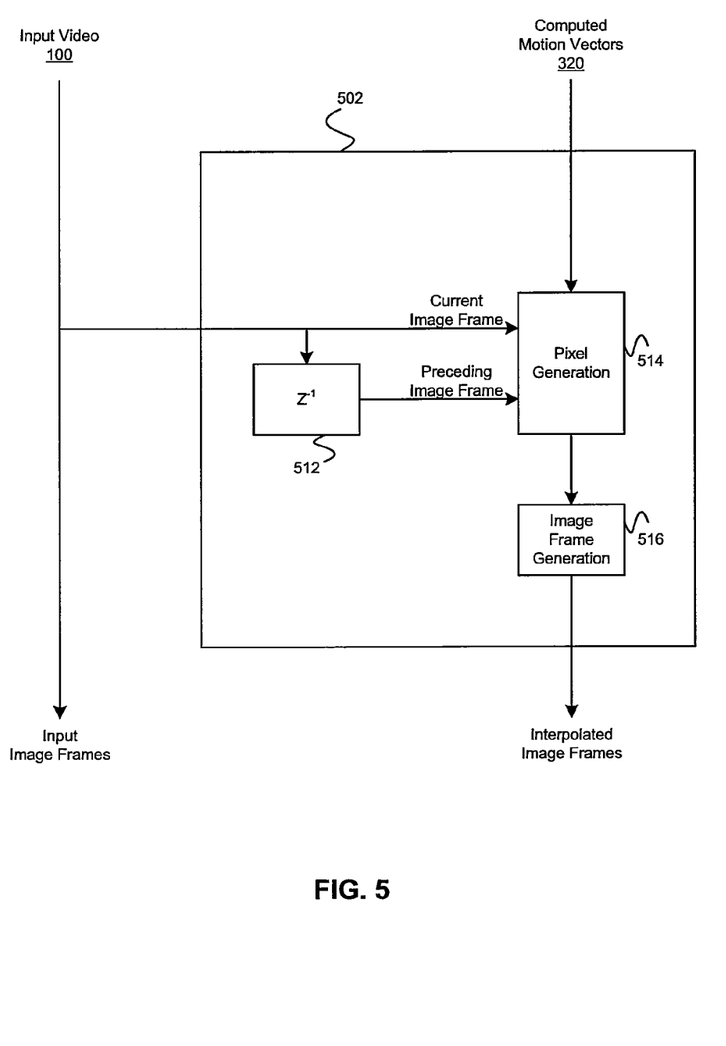
FIG. 5 is a block diagram of an exemplary system for generating interpolated image frames, in accordance with an embodiment of the invention.

FIG. 5 is a block diagram of an exemplary system for generating interpolated image frames, in accordance with an embodiment of the invention. Referring to FIG. 5, there is shown an image interpolation system 502. The image interpolation system 502 may comprise suitable logic, circuitry and/or code that may enable reception of input video 100 and computed motion vectors 320 (and/or computed motion vectors 120). The input video 100 received by the image interpolation system 502 may comprise one or more current image frames.

The image interpolation system 502 may comprise a delay block 512, a pixel generation block 514 and an image frame generation block 516. The delay block 512 may receive input video 100 and output a time delayed version of the input video. In an exemplary embodiment of the invention, the delay block 512 may insert a one image frame time delay between the received input video 100 and the output. The delay block 512 may receive one or more current image frames and output a one image frame time delayed version of the input current image frames. The time delayed version of the input current image frames may be referred to as preceding image frames.

The pixel generation block 514 may comprise suitable logic, circuitry and/or code that may enable reception of one or more current image frames, one or more preceding image frames and computed motion vectors 320. Based on these inputs, the pixel generation block 514 may enable generation of interpolated image processing blocks. The selection of motion vectors from the computed motion vectors 320 for generation of the interpolated image processing blocks may also be determined based on the motion vector bias value associated with each of the computed motion vectors 320. For example, if the motion vector bias value associated with a candidate motion vector selected from the computed motion vectors 320 exceeds a threshold value, the pixel generation block 514 may reject that candidate motion vector and select another candidate motion vector from the input computed motion vectors 320.

The pixel generation block 514 may comprise suitable logic, circuitry and/or code that may enable selection of a preceding image processing block within the preceding image frame and a current image processing block within the current image frame based on the selected motion vector. The pixel generation block 514 may generate pixel values within the interpolated image processing block based on the corresponding pixel values within the selected preceding and current image processing blocks.

The image frame generation block 516 may comprise suitable logic, circuitry and/or code that may enable generation of interpolated image frames based on received interpolated image processing blocks. In an exemplary embodiment of the invention, the image frame generation block 516 may receive interpolated image processing blocks generated by the pixel generation block 514. The image frame generation block 516 may determine whether a sequence of received interpolated image processing blocks are contained within the same interpolated image frame. The image frame generation block 516 may determine the location of each received interpolated image processing block within an interpolated image frame. Upon assembling the group of interpolated image processing blocks associated with a given interpolated image frame the image frame generation block 516 may output a completed interpolated image frame.

Figure 6:
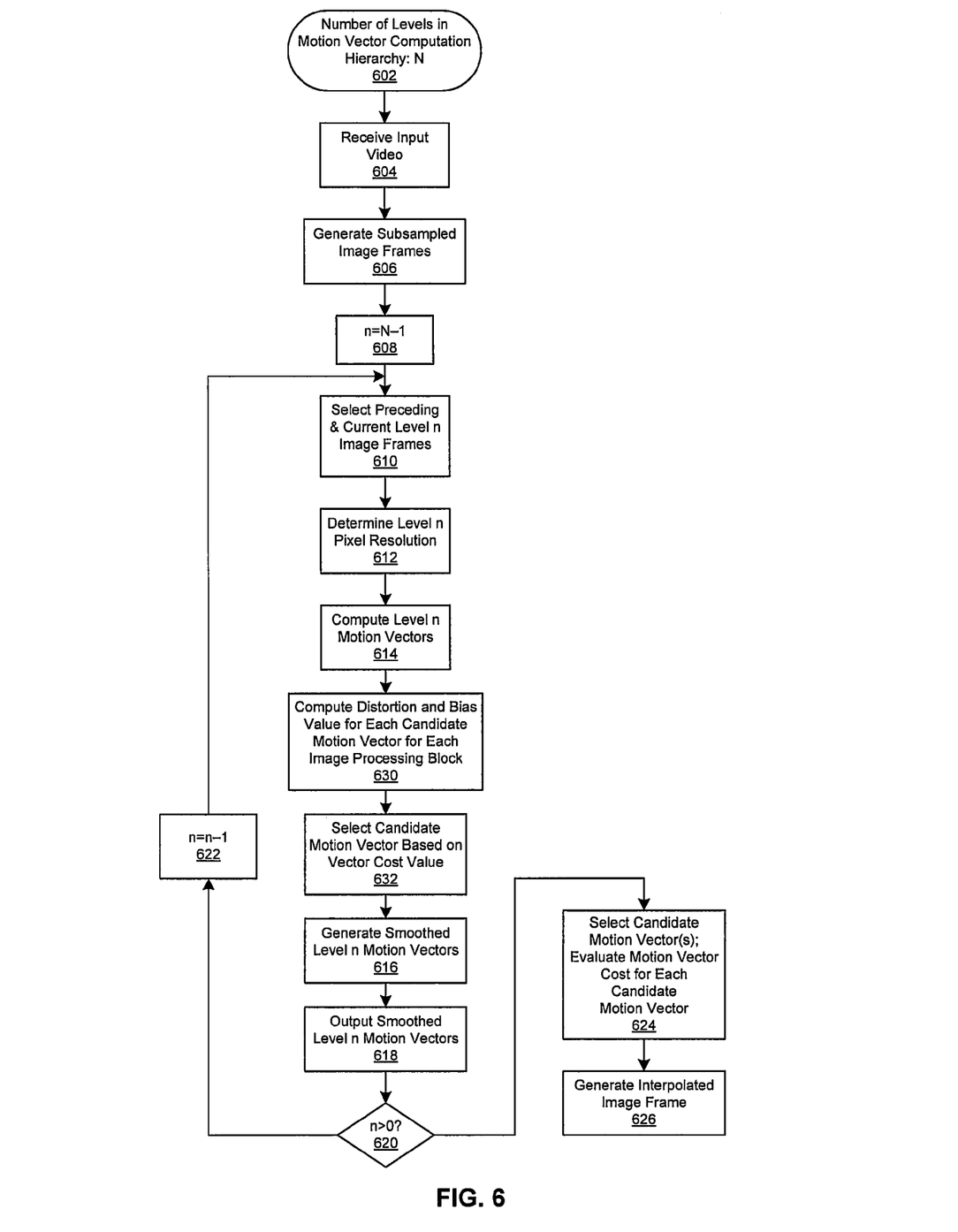
FIG. 6 is a flowchart illustrating exemplary steps for hierarchical motion estimation with multi-layer sub-pixel accuracy and motion vector smoothing, in accordance with an embodiment of the invention.

FIG. 6 is a flowchart illustrating exemplary steps for hierarchical motion estimation with multi-layer sub-pixel accuracy and motion vector smoothing, in accordance with an embodiment of the invention. Referring to FIG. 6, in step 602, the number of levels in the motion vector computation hierarchy may be determined to be N, where N represents a number. In step 604, input video 100 may be received. In step 606, a plurality of subsampled image frames may be generated. In an exemplary embodiment of the invention, one subsampled image frame maybe generated for each level in the motion vector computation hierarchy. In step 608, a loop counter variable may be set to a value n=N−1. In step 610, current and preceding image frames may be selected for the current level, level n, in the motion vector computation hierarchy. In step 612, the pixel resolution level, which is to be utilized within level n of the motion vector computation hierarchy, may be determined. In step 614, a plurality of level n motion vectors may be computed. In step 630 a distortion and bias value may be computed for each candidate motion vector that is computed for each image processing block. The distortion and bias value may correspond to a motion vector cost value. In step 632, for each image processing block, a candidate motion vector may be selected based on the vector cost value associated with each of the candidate motion vectors. In step 616, a plurality of smoothed level n motion vectors may be computed. In step 618, the plurality of smoothed level n motion vectors may be output. The output smoothed motion vectors may either be utilized for computing motion vectors in the next level in the motion vector computation hierarchy, or as candidate motion vectors, which may be utilized for generating an interpolated image frame. Step 620 may make the determination based on the condition n>0.

When step 620 determines that n is greater than zero, there may be additional levels in the motion vector computation hierarchy for which motion vectors are to be computed. In step 622, the loop counter variable, n, may be decremented in an exemplary embodiment of the invention. Following step 622, steps 610-618 may be repeated for the succeeding level in the motion vector computation hierarchy.

When step 620 determines that n is not greater than zero, an interpolated image frame may be generated. The interpolated image frame may be generated at the full pixel resolution level. In step 624, one or more candidate motion vectors may be selected. The corresponding motion vector cost for each candidate motion vector may be evaluated. In step 626, an interpolated image frame may be generated based on the selected candidate motion vectors and preceding and current image frames.

Another embodiment of the invention may provide a machine-readable storage having stored thereon, a computer program having at least one code section executable by a machine, thereby causing the machine to perform steps as described herein for hierarchical motion estimation with multi-layer sub-pixel accuracy and motion vector smoothing.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for image processing, the system comprising:
one or more circuits configured to:
generate subsampled image frames from input image frames, the generated subsampled image frames corresponding to hierarchical pixel resolution levels, a plurality of the hierarchical pixel resolution levels corresponding to subsampling levels differing from one another in subsampled pixel resolution;
for one of the subsampling levels at a first subsampled pixel resolution:
select a first image processing block of a first image frame and a second image processing block of a current image frame, the second image processing block selected based on a first correlation computation between the first image processing block and first plural pixel blocks of the current image frame;

interpolate pixel locations of the first and second image processing blocks to a first subpixel resolution; and determine first motion vectors based on the interpolated versions of the first and second image processing blocks; and for another of the subsampling levels at a second subsampled pixel resolution greater than the first subsampled pixel resolution:

determine locations of a third image processing block and a fourth image processing block of the first and current image frames, respectively, based on the determined first motion vectors;

select the third image processing block and the fourth image processing block, the fourth image processing block based on a second correlation computation between the third image processing block and second plural pixel blocks of the current image frame;

interpolate pixel locations of the third and fourth image processing blocks to a second subpixel resolution;

determine second motion vectors based on the interpolated versions of the third and fourth image processing blocks; and provide the second motion vectors for processing at another of the hierarchical pixel resolution levels.

2. The system of claim 1, wherein the first subpixel resolution is the same pixel resolution as the second subpixel resolution.

3. The system of claim 1, wherein said one or more circuits are further configured to:

for a full resolution level of the hierarchical pixel resolution levels:

determine locations of a fifth image processing block and a six image processing block of the first and current image frames, respectively, based on the determined second motion vectors;

select the fifth image processing block and the sixth image processing block, the sixth image processing block based on a third correlation computation between the fifth image processing block and third plural pixel blocks of the current image frame;

determine third motion vectors based on the fifth and sixth image processing blocks; and provide the third motion vectors for further processing.

4. The system of claim 3, wherein said one or more circuits are configured to provide said first, second, and third motion vectors by respectively determining a bias value for each candidate motion vector, applying a cost value, distortion value, or combination of both to the bias value, and generating a respective smoothed motion vector.

5. The system of claim 4, wherein said one or more circuits are configured to use a smoothing algorithm comprising a filtering algorithm, the filtering algorithm using an average or median value for the candidate motion vectors.

6. The system of claim 4, wherein said one or more circuits are configured to determine the bias value based on the candidate motion vectors and a predicted motion vector.

7. The system of claim 6, wherein said predicted motion vector is based on a median value of said third motion vectors or based on a corresponding motion vector from the second motion vectors.

8. The system of claim 4, wherein said one or more circuits are configured to determine the distortion and the cost values based on a sum of absolute differences, mean square error, or a combination of both.

9. The system of claim 3, wherein said one or more circuits are further configured to:

receive the third motion vectors;

delay the input image frames; and generate interpolated image frame blocks based on the received third motion vectors, the input image frames, and the delayed input image frames.

10. The system of claim 9, wherein said one or more circuits are further configured to:

receive the interpolated image frame blocks;

determine whether a sequence of the received interpolated image frame blocks are contained within a same interpolated image frame; and output a completed interpolated image frame responsive to the determination.

11. The system of claim 1, wherein said one or more circuits are further configured to:

for a full resolution level of the hierarchical pixel resolution levels:

determine locations of a fifth image processing block and a six image processing block of the first and current image frames, respectively, based on the determined second motion vectors;

select the fifth image processing block and the sixth image processing block, the sixth image processing block based on a third correlation computation between the fifth image processing block and third plural pixel blocks of the current image frame;

interpolate pixel locations of the fifth and sixth image processing blocks to a third subpixel resolution;

determine third motion vectors based on the interpolated versions of the fifth and sixth image processing blocks; and provide the third motion vectors for further processing.

12. A method for image processing, the method comprising:

generating subsampled image frames from input image frames, the generated subsampled image frames corresponding to hierarchical pixel resolution levels, a plurality of the hierarchical pixel resolution levels corresponding to subsampling levels differing from one another in subsampled pixel resolution; and for a current of the hierarchical pixel resolution levels:

determining locations of a first image processing block and a second image processing block of first and current image frames, respectively, based on motion vectors determined from a previous subsampling level;

selecting the first image processing block and the second image processing block, the second image processing block selected based on a correlation computation between the first image processing block and plural pixel blocks of the current image frame; and determining motion vectors for the current hierarchical pixel resolution level based on the first and second image processing blocks.

13. The method of claim 12, wherein the current hierarchical pixel resolution level corresponds to one of the subsampling levels, wherein determining the motion vectors for the current hierarchical pixel resolution level is based on an interpolated version of the first and second image processing blocks.

14. The method of claim 13, further comprising:

determining, for a subsequent of the hierarchical pixel resolution levels, locations of image processing blocks of the first and current image frames based on the determined motion vectors;

selecting the image processing blocks of the first and current image frames of the subsequent hierarchical pixel resolution level;

determining motion vectors for the subsequent hierarchical pixel resolution level based on an interpolated version of the image processing blocks of the first and current image frames of the subsequent hierarchical pixel resolution level; and providing the determined motion vectors for processing at another of the hierarchical pixel resolution levels.

15. The method of claim 12, wherein the current hierarchical pixel resolution level corresponds to a full pixel resolution level.

16. The method of claim 12, wherein determining the motion vectors comprises determining a bias value for respective candidate motion vectors, applying a respective cost value, distortion value, or combination of both to the bias value, and generating respective smoothed motion vectors.

17. The method of claim 12, further comprising:
receiving the determined motion vectors;
delaying the input image frames; and
generating interpolated image frame blocks based on the received motion vectors, the input image frames, and the delayed input image frames.

18. The method of claim 17, further comprising:
receiving the interpolated image frame blocks;
determining whether a sequence of the received interpolated image frame blocks are contained within a same interpolated image frame; and
outputting a completed interpolated image frame responsive to the determination.

19. A system for image processing, the system comprising: one or more circuits configured to:
generate subsampled image frames from input image frames, the generated subsampled image frames corresponding to hierarchical pixel resolution levels, a plurality of the hierarchical pixel resolution levels corresponding to subsampling levels differing from one another in subsampled pixel resolution; and for a current of the hierarchical pixel resolution levels:
determine locations of a first image processing block and a second image processing block of first and current image frames, respectively, based on motion vectors determined from a previous subsampling level;
select the first image processing block and the second image processing block, the second image processing block selected based on a correlation computation between the first image processing block and plural pixel blocks of the current image frame; and
determine motion vectors for the current hierarchical pixel resolution level based on the first and second image processing blocks.

20. The system of claim 19, wherein the current hierarchical pixel resolution level corresponds to:
one of the subsampling levels, wherein the one or more circuits are configured to determine the motion vectors for the current hierarchical pixel resolution level based on an interpolated version of the first and second image processing blocks; or
the current hierarchical pixel resolution level corresponds to a full pixel resolution level.

* * * * *